United States Patent [19]

Peil

[11] Patent Number: 4,806,937
[45] Date of Patent: Feb. 21, 1989

[54] POWER DISTRIBUTION SYSTEM FOR A PHASED ARRAY RADAR

[75] Inventor: William Peil, North Syracuse, N.Y.

[73] Assignee: General Electric Company, Syracuse, N.Y.

[21] Appl. No.: 140,292

[22] Filed: Dec. 31, 1987

[51] Int. Cl.[4] ............................................. G01S 13/00
[52] U.S. Cl. .................................. 342/175; 333/136; 342/374
[58] Field of Search ............... 342/175, 368, 369, 371, 342/372, 374, 157; 333/253, 254, 260, 124, 125, 21 A, 34, 17 M, 32

[56] References Cited

U.S. PATENT DOCUMENTS

| | | | |
|---|---|---|---|
| 3,953,853 | 4/1976 | Carter et al. | 342/374 |
| 4,124,852 | 11/1978 | Stendel | 342/374 |
| 4,251,817 | 2/1981 | Kimura et al. | 342/175 |
| 4,259,743 | 3/1981 | Kaneko et al. | 342/175 X |
| 4,433,313 | 2/1984 | Saint et al. | 333/109 |
| 4,583,096 | 4/1984 | Bellman et al. | 342/368 |
| 4,682,176 | 7/1987 | Jones | 342/175 |

Primary Examiner—Thomas H. Tarcza
Assistant Examiner—John B. Sotomayor
Attorney, Agent, or Firm—Richard V. Lang; Carl W. Baker; Fred Jacob

[57] ABSTRACT

The invention relates to the distribution of power and control commands to a plurality of pulsed T/R modules coupled to the antenna elements of a phased array radar and arranged in rows and columns. The novel power distribution system includes a large number of small capacitors, at least one per module, a lesser number of large capacitors, at least one at each end of each row, and bus bars dimensioned for a very small r.f. impedance for supplying peak power in a timely manner to the modules from the large capacitors. Each row has four large (1KW) dc power supplies for providing the average power. The power conditioning elements within the modules are of reduced bulk while achieving "droop" free operation. The control commands are carried by lower current capacity runs on a layer laminated to the bus bar.

Connectors attached to the laminated bus bar and indexed at the module positions provide high power and control commands. The arrangement permits automated testing of the connections and is of high reliability.

11 Claims, 7 Drawing Sheets

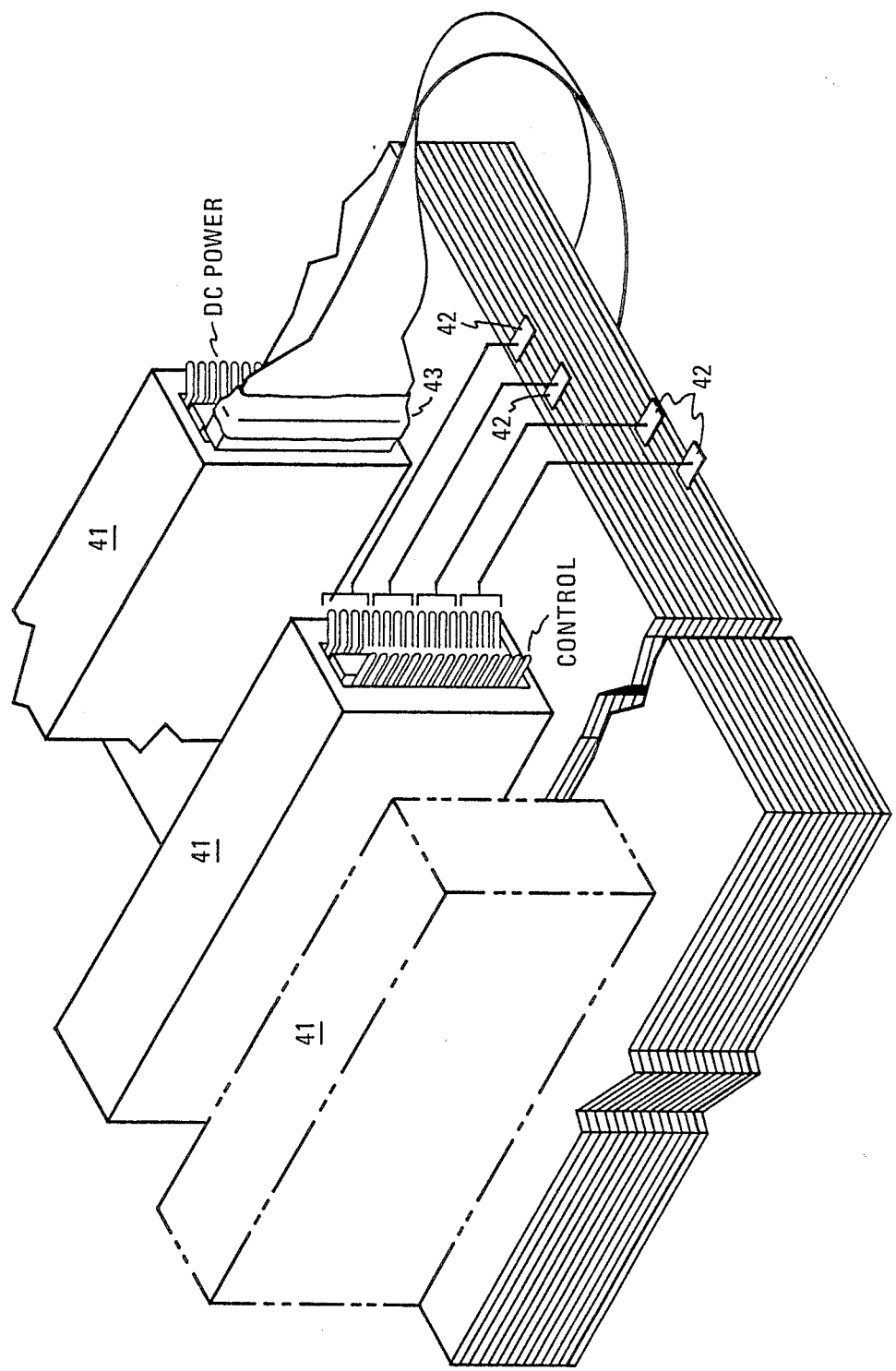

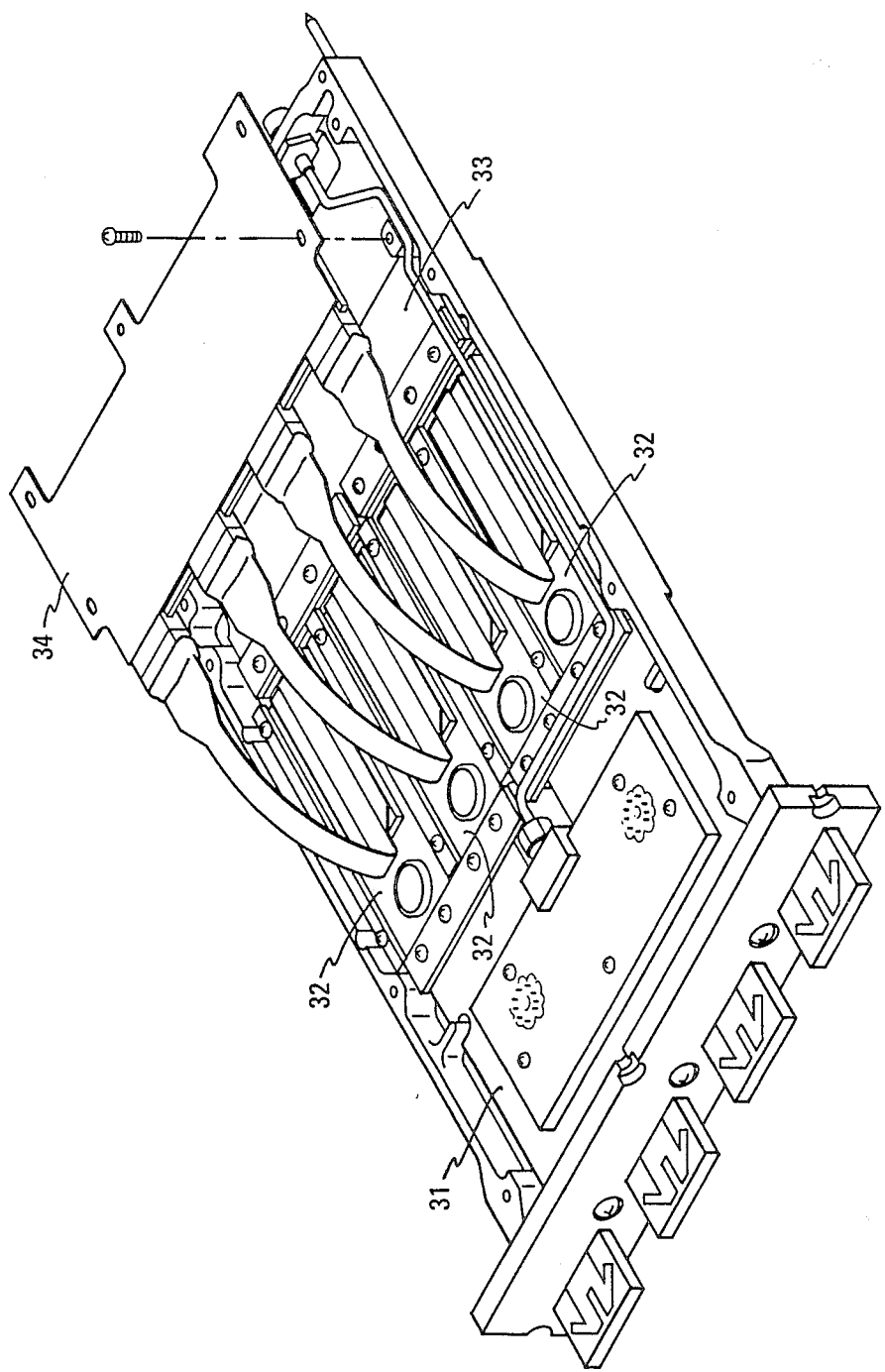
FIG. 4 T/R SUBASSEMBLY

POWER DISTRIBUTION SYSTEM FOR A PHASED ARRAY RADAR

CROSS REFERENCE TO RELATED APPLICATION

This application is related to the following commonly assigned application of William Peil and Donald F. Perkins, application Ser. No. 138,795. The entire disclosure of the foregoing application is incorporated herein by reference.

BACKGROUND OF THE INVENTION

1. Field of the Invention

The invention relates to the distribution of power and control commands to a plurality of pulsed transmitting modules used to drive antenna elements of a phased array radar, and more particularly to a power distribution system which permits minimization of the power conditioning elements associated with the individual modules.

2. Prior Art

In a conventional phased array radar system, a low power exciter generates the carrier of the transmitted radar signal. The exciter output is modulated in amplitude and/or phase to generate radar pulses of low power. These low power pulses are then distributed in controlled amplitude and phase to an array of power amplifying modules each arranged to drive an antenna element of the phased array. In order to conserve energy, minimize heating, and maximize peak power, the power amplifying modules are turned on a moment before the modulated exciter pulse begins and are turned off a moment after the modulated exciter pulse ends.

In a conventional power supply for a radar transmitter, the power supply is designed to handle the average power consumed by the transmitter during intermittent operation with reliance being placed on energy storage in large capacitors to sustain the voltage on the transmitter when a high peak power is required from the supply during the pulse.

The supply voltage can be better sustained with additional energy storage, but only at the cost of added bulk. The term "capacitor droop" has been applied to the effect on the transmitted pulse of a falling supply voltage at the transmitter or power amplifier. Capacitor droop is present to some degree in most radar transmissions. If a single transmitter or power amplifier feeds all the antenna elements, the droop is simultaneous on all antenna elements and the adverse effect on the beam is small. However, when each antenna element has one or a plurality of power amplifiers, and the power amplifiers have potentially different power supplies, then the problem becomes severe. Here the reactive energy storage properties of the supplies must remain matched or the "droop" will not be simultaneous at all elements in the array and the beam will be distorted and pulse-to-pulse correlation severely reduced.

The transmitting power modules of current design employ solid state components in the power modules driving the antenna elements. Metal Oxide Semi-conductor Field Effect Transistors (MOSFETs) or High Electron Mobility Transistors (HEMT) are commonly used in this application, and such devices are often fabricated on a Gallium Arsenide substrate. At frequencies in excess of 1 GHZ, a Monolithic Microwave Integrated Circuit (MMIC) format, which combines passive circuit features with the active devices on a Gallium Arsenide substrate is common. These circuits are particularly compact.

In the conventional power conditioner for transmitting power modules, a common element is the switch, which turns the power on and off (hence the term "drain switch" by virtue of its connection to the drain electrode of a field effect transistor), accompanied by local capacitors to sustain the dc when peak power is required. With the advent of higher frequency operation and MMIC fabrication techniques, the MMIC r.f. circuits in the transmitting modules tend to be dwarfed by their associated power supply components. In such applications, it is particularly desirable that the module power conditioner be of minimum bulk.

Viewed as an entity, a phased array radar system must contain a large number of power modules which may be distributed in rows and columns in positions to the rear of rows and columns of antenna elements making up the array. In this arrangement, one may expect the numbers of modules to be in the thousands, and the numbers of control connections to be in the tens of thousands. The interconnection problem for both power and control functions is accordingly a severe one.

SUMMARY OF THE INVENTION

Accordingly, it is an object of the invention to provide an improved power distribution system for transmitting modules in a phased array radar system.

It is another object of the invention to provide a power distribution system which requires minimum bulk at the transmitting modules in a phased array radar system.

It is still another object of the invention to provide an improved method of distribution power and control commands to the transmitting modules in a phased array radar system.

These and other objects of the invention are achieved in a novel power distribution system for an array of transmitting subassemblies containing transmitting power amplifiers arranged in rows and columns behind the antenna elements in a phased array radar system, and simultaneously demanding high current low voltage dc power in pulses of variable duration.

The system comprises a plurality of subassembly connectors, each supplying low voltage dc power to an associated subassembly, and suitably disposed in rows and columns at the subassembly positions, and a first plurality of smaller energy storage capacitors, each disposed at a subassembly position and connected to the proximate subassembly power connector. Each of the smaller capacitors has adequate capacity and an adequately low series resistance to provide the peak power required by the associated subassembly during a first short period embracing the beginning of each pulse. Peak power is provided while maintaining the voltage at the subassembly power connector within a predetermined difference from the no load value acceptable for operation of the power amplifiers.

The system further comprises a plurality of high current, low voltage, high power dc supplies, one disposed at one end of each row of subassemblies and having adequate average power capacity to operate the transmitting subassemblies in the associated row, and a second plurality of larger energy storage capacitors, one capacitor being disposed at at least one end of each row of subassemblies. The total energy storage capacity should be large enough and the series resistance should be small enough to provide the peak power required by the subassemblies in the associated row for a second longer period commencing before the end of the first period and embracing the final portions of pulses.

Power is conveyed from the high power dc supplies and large energy storage capacitors by means of a plurality of laminated low r.f. impedance bus bars, one for each row of subassemblies. Low r.f. impedance is achieved by use in each power transmission path, of a flat ungrounded conductor disposed between a pair of grounded conductors to double the already substantial width of the path from capacitor to subassembly for the efficient transmission of high frequency energy.

The r.f. impedance of the laminated bus bar and the series resistance of the large energy storage capacitors are kept low so as to maintain the voltage at the subassembly connectors within the predetermined difference from the no load value from the end of the first period through the second period.

In a preferred configuration, the large energy storage capacitors are provided at each end of the bus bar to minimize the path lengths and further reduce the r.f. impedance.

In addition, regulating means are provided at each subassembly to sustain the voltage at the power amplifier(s) in that subassembly at a fixed value so long as the voltage at the subassembly power connector is within the predetermined difference from the no-load value. This means may be used to completely eliminate power supply variations at the individual transmitting module.

Further in accordance with the invention, a flex strip containing control command conductors is combined with the laminated bus bar providing power to the T/R subassemblies. Thus the subassembly connectors disposed along the bus bars may be provided with connections for conveying both power and control commands to the individual subassemblies.

BRIEF DESCRIPTION OF THE DRAWINGS

The inventive and distinctive features of the invention are set forth in the claims of the present application. The invention itself, however, together with further objects and advantages thereof may best be understood by reference to the following description and accompanying drawings, in which:

FIGS. 3A, 3B, 3C and 3D are illustrations of the construction of a multi-conductor bus bar supplying power and controlling the T/R sub-assemblies; FIGS. 3A-3C illustrating the power distribution features, with FIG. 3D showing the connections performing a control function as well, FIG. 4 is an illustration of one T/R sub-assembly, containing four T/R modules used to operate four antenna elements and containing filter capacitors and four novel module regulating drain switches which further condition the dc power supplied to the T/R modules.

DESCRIPTION OF THE PREFERRED EMBODIMENT

Figure 1:
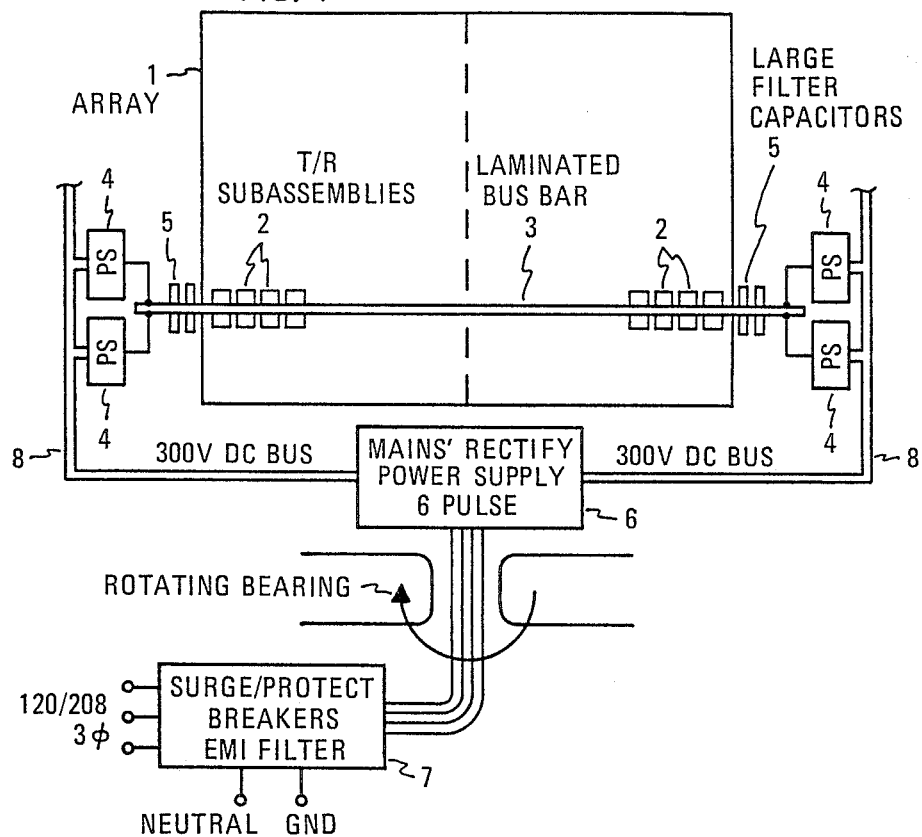
FIG. 1 is a schematic illustration of the back of a phased array radar system showing an arrangement of an array of T/R sub-assemblies, each of which operates four rows of T/R elements within the array, and the means for supplying power to the sub-assemblies.

FIG. 1 is an illustration of the back of the antenna array 1 of a phased array radar system, showing the placement of one row of transmit/receive subassemblies (2), each connected to a set of four antenna elements, and the means (4-8) for supplying power to the T/R sub-assemblies.

The illustrated array employs 3584 antenna elements, 64 antenna elements per horizontal row and 56 antenna elements per vertical column. Since each sub-assembly operates a "set" of four antenna elements in the same vertical column, fourteen rows of antenna connected sub-assemblies are required per column and 64 sub-assemblies are required per row. The array thus requires a total of 896 sub-assemblies to operate 3584 antenna elements.

The source of power for each row of sub-assemblies is four 1 KW power supplies (4) and eight large filter capacitors (5) disposed at the sides of the array (1). Power is supplied from the power supplies (4) and large filter capacitors (5) to the sub-assemblies (2) by means of a laminated multi-conductor bus bar (3). The laminated bus bar (3) has the properties required for efficient transmission of power of typical radar pulse duration to four rows of MMIC transmitting modules, each row containing 64 radiating elements.

Figure 2:
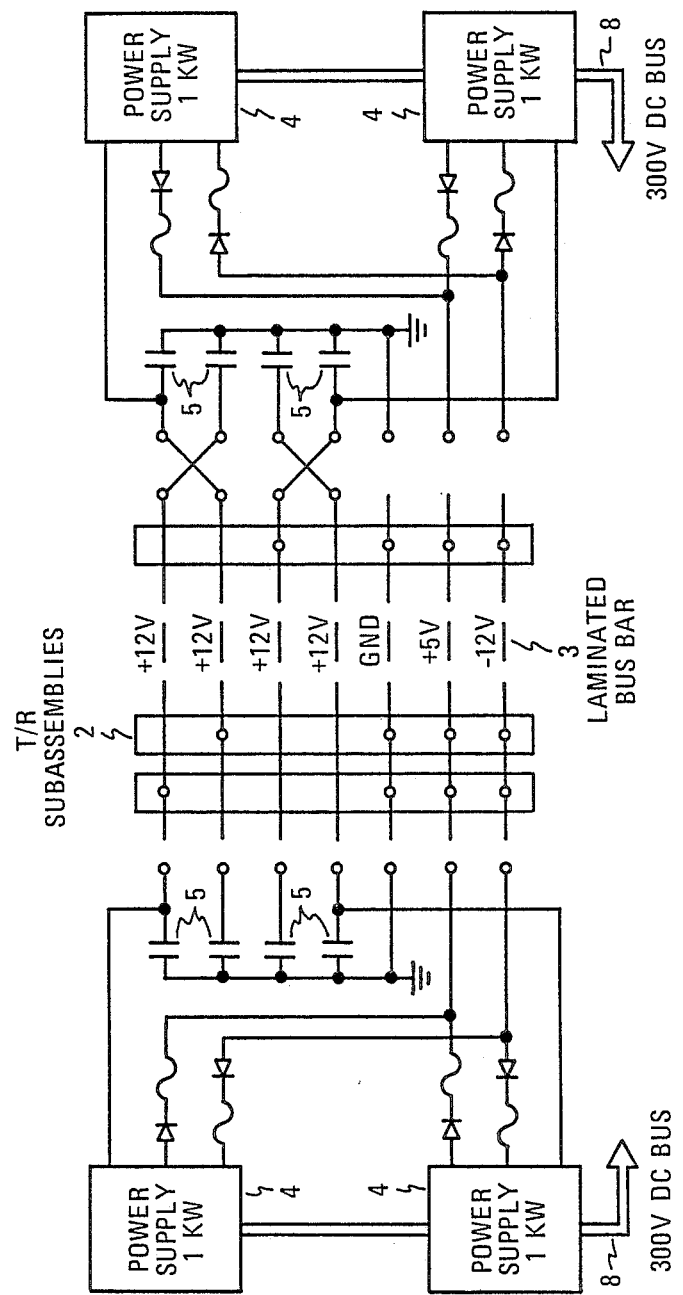
FIG. 2 is a more detailed illustration of the dc power supplies, providing power to one row of T/R sub-assemblies.

The disposition of the 1 KW power supplies (4), large filter capacitors (5), and the T/R sub-assemblies (2) and their connections to the bus bar (3) are illustrated in FIGS. 1 and 2. Four large (100,000 uF, 16 volt) filter capacitors (5), are disposed at the right end of the bus bar and four like capacitors are disposed at the left end of the bus bar. Similarily two 1 KW power supplies (4) are disposed at the right end of the bus bar and two 1 KW power supplied (4) are disposed at the left end of the bus bar. Altogether 112 such capacitors and 56 such power supplies are required for the exemplary 3584 element array.

Each power supply (4) supplies one kilowatt of power at +12 volts to 16 of the T/R sub-assemblies in a row of 64 T/R sub-assemblies. The +12 volt conductors of the bus bar are used to supply the large amounts of power required by the power amplifiers during pulse transmission. The +5 volt conductor of the bus bar is used to provide the lower amounts of power required by the receiver's low noise amplifiers and the −12 volt conductor of the bus bar is used to provide the bias, also at very low power. These latter low power voltages are netted for reliability.

The bus bar (3), which is symbolically illustrated in FIG. 2, and physically illustrated in FIGS. 3A-3D is a multi-layer laminate along which connectors are placed at 64 locations. The 64 T/R sub-assemblies in one row are pseudo-randomly connected to each of the 1 KW power supplies (4) such that each supply drives sixteen T/R sub-assemblies. This mode of connection is made so that failure of one of four supplies would provide a minimum disruption of transmitter performance and the netting applicable to the +5 and −12 volt supplies virtually assures no disruption of receiver performance.

The structure of the laminated bus bar applicable to the power supply system is illustrated in FIGS. 2 and 3A–3C, FIG. 3D illustrating both the power and the control features. Power conduction of the bus bar is provided by six power transmission paths providing respectively four transmission paths for +12 volts (for transmitting power), another for +5 volts (for receiver power), and another for −12 volts (for low power biasing) with interspersed grounds. Each power transmission path consists of a conductive copper layer approximately 0.020" in thickness by 2" in width with a dielectric layer two to three thousandths inches thick separating the principal conductor from a pair of ground planes, also of 0.020" copper disposed to either side of the principal conductor. The taps to the individual sub-assemblies are taken from the back edges of the strip conductors by an ultrasonic bond. As implied in FIG. 1, the taps occur at 64 intervals corresponding to the positions of the T/R sub-assemblies between the ends of the bus bar. The tap construction is indicated more particularly in FIG. 3B.

The power supplies (4) are netted, as suggested earlier, so that the receiving and negative bias function will not be impaired by failure of less than all four power supplies (4) feeding the same row. As shown in FIG. 2, each +5 volt supply and each 31 12 volt supply is coupled via a fuse and a suitably poled protective diode to the +5 and the 31 12 volt bus conductors. In the event of failure of a supply (4), the remaining supplies are connected to provide energy to the bus conductor and the failed supply is isolated by the diode. Meanwhile the net is further protected against diode failure by a fuse.

The 1 KW power supplies (4), whose load connections to the T/R sub-assemblies are also shown in FIG. 2, are in turn supplied power by a 300 volt dc bus (8) connected to a six pulse 56 KW ac main supply (6), shown in FIG. 1. A protective circuit (7) is provided which delivers three phase power to the mains supply (6) after it has been conditioned by EMI filtering, primary circuit breakers, and line surge protection.

The bus bar (3), 1 KW power supplies (4), large capacitors (5), 300 volt buses (8), mains rectify supply (6), and protective circuit (7) are designed to provide the required power for operation of the pulsed T/R assemblies in all (transmit, receive and calibrate) modes of operation. The members of the power distribution system must provide both the required average power and the substantially higher peak powers which are required during pulsed transmission to T/R sub-assemblies. The power distribution system, to avoid significant droop in voltage supplied to the transmitter electronics during transmission of a single pulse, or carry over from previous pulses, must be designed so that, at the individual T/R subassemblies any droop is held to a tolerable minimum This permits precise regulation, as will be explained later. This tolerable minimum is set by the head room required for operation of the regulator placed within the individual T/R sub-assemblies plus the voltage required at the transmitting module forming the ultimate load.

Recapitulating, the power distribution system provides four kilowatts of power to the 64 T/R subassemblies distributed along each bus bar, and 56 kilowatts of power to all 14 buses feeding the full array. Power for transmitter operation is supplied to the +12 volt conductors of the bus bar by the four 1 KW power supplies (4) and the eight 100,000 microfarad 16 volt capacitors, placed at the ends of the +12 volt conductors of the bus bar (3). The one kilowatt supplies (4) provide a continuous supply of energy to the large storage capacitors (5) connected to the bus bar conductors (3). The pulsed loads presented by the individual T/R sub-assemblies require energy simultaneously during pulses of variable duration The durations are roughly between a microsecond and milliseconds. The pulsed loads thus withdraw power from the capacitors (5) and from the sources (4) via the bus bars at higher peak powers than the average power. This tends to cause a voltage reduction at the loads in the course of a single pulse or, from pulse- to-pulse. Were measures not taken to support a constant voltage at the individual T/R sub-assemblies, transmitter operation would be compromised.

Compromised operation in accordance with the invention is avoided by the provision of substantial energy storage at the ends of the bus bar, as already noted, critical design of the bus bar to reduce the voltage drop to tolerably small limits as the pulse progresses or repeats, and by the use of additional capacitance and voltage regulation within each of the T/R sub-assembly loads.

FIG. 4 shows a T/R sub-assembly which as one of 896 like T/R sub-assemblies forms an ultimate load of the power supply system. The T/R sub-assembly may be regarded as divided into four parts consisting of an antenna distribution circuit 31, a beam former distribution circuit 33, a phase shifter and T/R circuit or module 32, and a power and control block assembled on the substrate 34.

The antenna distribution circuit 31 has three functions. In transmission, it couples the outputs of four pulsed high power amplifiers on an individual basis to each of four antenna elements. In reception, the antenna distribution network delivers the signal returns from four dipole elements on an individual basis to each of four low noise amplifiers. During monitoring of the state of the circuits in the sub-assembly, particularly the phase shifter, couplers are provided to check the phase of the signal at each antenna element for calibration purposes. The antenna distribution circuit 31 is passive, and is most conveniently carried out using stripline transmission lines, which provides good shielding between circuits in the chassis, at low cost, and with the necessary compactness. It dissipates negligible power in the T/R sub-assembly.

The beamformer distribution circuit 33 distributes a signal multiplexed from four separate receiving antennas to a single channel leading to the beamformer during reception, and similarly couples signals from the beamformer intended to operate with four antenna elements. The beamformer distribution circuit has no active elements, and is preferably carried out using stripline transmission lines. It, likewise dissipates negligible power in the T/R sub-assembly.

The phase shifter and T/R circuit or "module" 32 is connected between the antenna distribution circuit and the beamformer distribution circuit. It requires both active and passive elements. While it may eventually be formed on a single monolithic Gallium Arsenide substrate, present economics dictate a hybrid construction of the module. Microstrip construction is presently the only practical approach.

The modules each contain the receiving and transmitting electronics associated with one antenna element. The receiving electronics typically includes low noise amplifiers and a variable gain amplifier. The transmitting electronics likewise associated with one antenna element, typically includes a driver amplifier, and a power amplifier, often subject to gain control. As earlier noted, the electronics requires −12, +5 and +12 volt dc supplies, the last of which provides the principal power for pulse transmission.

The T/R sub-assembly includes the control logic for operating the phase shifter and determining the transmit/receive calibrate states and further includes local power conditioning which includes additional capacitors and a switching voltage regulator. The power conditioning and control circuitry dissipate measurable amounts of electrical power.

The T/R sub-assembly thus contains the electronic circuits, used to operate four elements of a phased array in a radar system operating from 5 to 6 GHz and the local capacitors and voltage regulators which are the last elements in the power distribution system. Each T/R sub-assembly, the ultimate load and the recipient of the power distributed from the bus, is designed to radiate up to 40 watts of r.f. power while dissipating 200 watts of heat. Accordingly, the sub-assembly chassis must be large enough to contain the active electronics and the local capacitors and regulators and small enough to permit the necessary air passages required to carry off the heat generated.

In the phased array radar system under consideration, each T/R sub-assembly is required to stay within the cross-sectional area requirements of the associated antenna elements. A set of four antenna elements has proven to be the most satisfactory grouping. The antenna elements are spaced from about one-half to two-thirds wavelengths apart, depending upon the scanning range. In the present arrangement a relatively low vertical scanning range is contemplated allowing the vertical spacing of the antenna elements to be about two-thirds of a wavelength. With a larger horizontal scanning range, the horizontal spacing between dipole elements is about one-half wavelength. Under these circumstances the antenna elements, if dipoles, will be oriented in a vertical plane, since there is greater available space in the vertical direction, and air spaces between sub-assemblies will be provided parallel to the vertical columns.

The demand that the cross-sectional area of the antenna operating circuitry not exceed the area dimensions of the array, forces the cross-sectional area of each sub-assembly chassis containing the antenna operating circuits to stay within the one-half to two-thirds wavelength dimensions allowed per antenna element. This spacial restriction allows all r.f. paths at the T/R sub-assemblies to be of equal length and the sub-assemblies to be interchanged.

In the example at hand, the electronic circuits of a T/R sub-assembly for operating four antenna elements, fall within an overall cross-sectional dimension of 16 cm × 2.7 cm, or 4 cm × 2.7 cm per antenna element. This cross-section is compact enough for an array operating at 5 to 6 GHz.

The control circuits implement high level beam steering commands from a remote control computer, compute low level beam steering commands and perform the self calibration function In the self calibration function, phase errors in the individual modules are periodically measured and corrected for essentially all errors, including fixed voltage errors—but not voltage drift—attributable to the power supply system.

Figure 5:
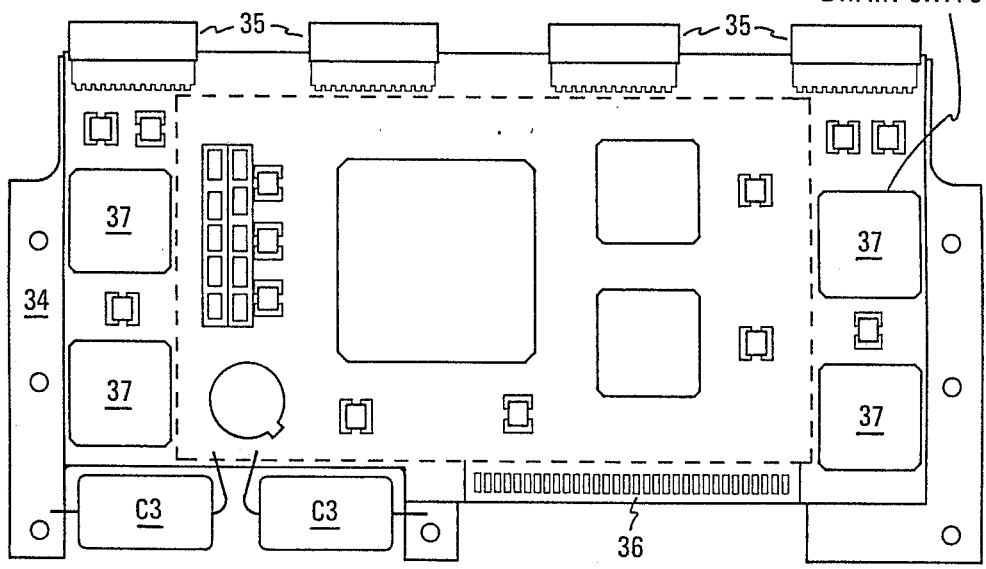
FIG. 5 is a plan view of the substrate upon which the control unit, filter capacitors and the regulating drain switches for four modules within one T/R sub assembly are mounted.

The local power conditioning circuits, referring to FIG. 5, include four regulating drain switches (37) each assigned to one module. Two local filter capacitors (C3) are shared between the four regulating drain switches. The four "regulating drain switches" (37) are mounted on a small aluminum substrate (34). The local power conditioning provides the required regulation to stabilize the local transmission loads to better than one millivolt during a pulse or from pulse-to-pulse in transmitter operation.

The aluminum substrate (34), upon which the control circuits and the local power conditioners are mounted, is provided with a row of four sockets (35) for connection to connectors leading to the individual T/R modules (32). These connectors provide local steering commands, timing controls and power to the T/R modules. The same signals, except for the steering commands, which are at a higher level, are supplied to the T/R sub-assembly by thirty-one pads (36), mounted on an auxiliary circuit board attached to the substrate (34). The pads (36) are designed to be connected to a connector, not illustrated, but designed for a socket supported on the laminated bus bar (3) as illustrated in FIG. 3D.

The four module regulating drain switches (37) are placed at the two ends of the substrate (34), and the shared filter capacitors C3, which are typically of 100 microfarads, twenty volt ratings, are placed at the back edge of the substrate adjacent to the thirty-one pads (36). The module regulating drain switches (not including the capacitors C3) are placed within small square hermetic packages approximately ½ inch on an edge on the aluminum substrate (37). The aluminum substrate is approximately 4¾ inches × 2½ inches.

The regulating drain switches (37), during radar pulse transmission, are designed to turn on and turn off the MMIC power amplifiers within short intervals and to do so to a precise digitally controlled power level. The regulating feature of the drain switch is designed to operate at a rate comparable to the rise times and fall times of the transmitted radar pulses, and to sustain any variation occuring during the pulses. For this purpose, the gain bandwidth of the drain switch is set between one and 10 megaHertz. The upper limit to the gain bandwidth, as will be explained, is normally set low enough to avoid ringing in the module loads.

Since the regulating drain switches have megaHertz gain band widths, they are capable of providing substantially instantaneous corrections for the real time changes in load or in the supply present during pulsed radar transmissions and are able to maintain the 10–12 volt dc supply outputs with millivolt accuracies at the individual T/R modules. The outputs of each of the several thousand power amplifiers in a single radar system are thereby stabilized against load or power supply induced changes in pulse amplitude thus permitting the maximum possible pulse-to-pulse correlation to exist.

In addition to the foregoing, the regulating drain switches, provides means to prevent destruction of the MMICs within the T/R module in the event of hardware or software failure.

Figure 6:
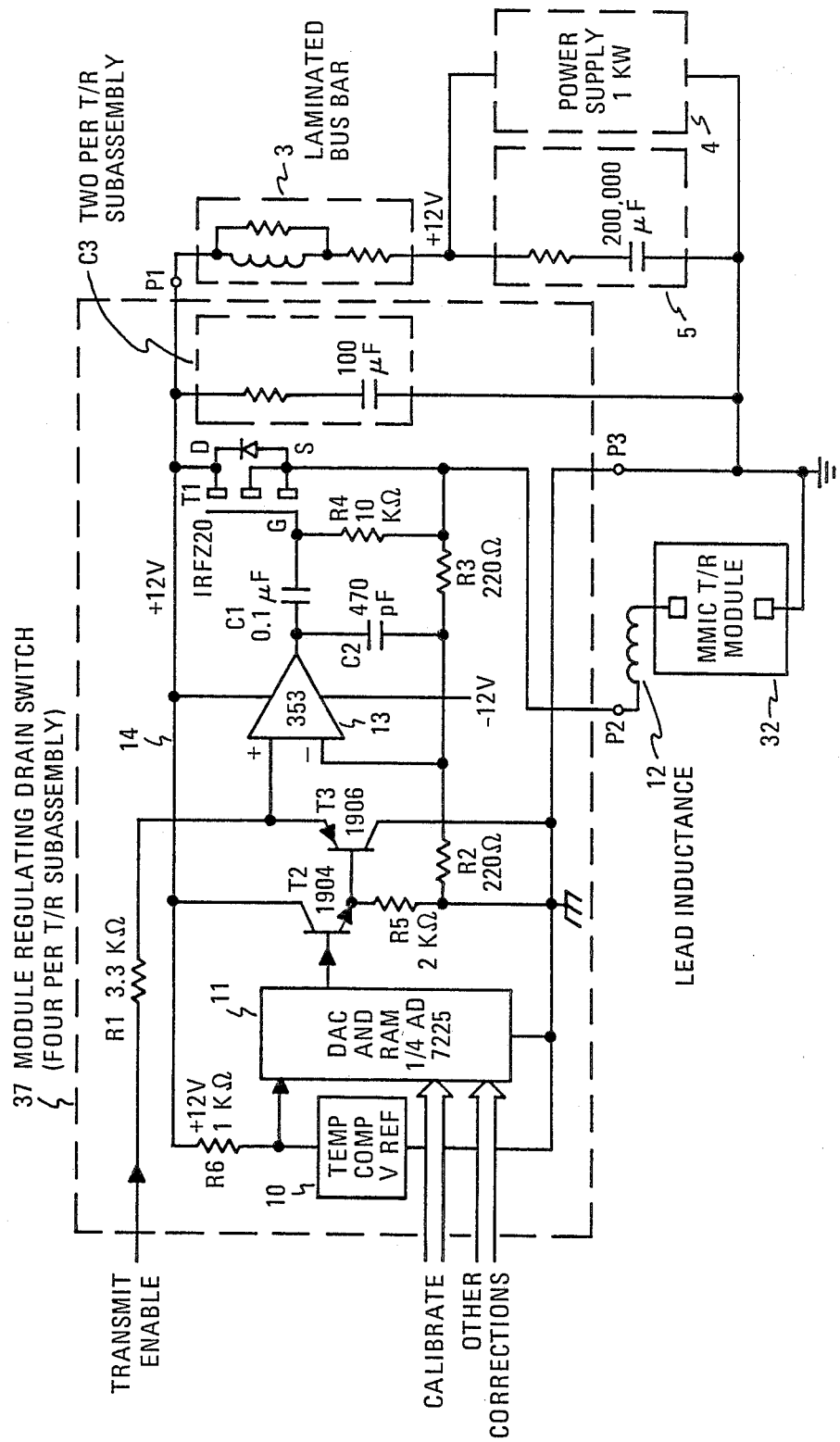
FIG. 6 is an electrical circuit diagram showing a module regulating drain switch, the filtering and power distribution path from the associated power supply.

The electrical circuit of the digitally programmable regulating drain switch and its external connections to a source of power to a load and to appropriate control signals are illustrated in FIG. 6.

Each regulating drain switch has three power terminals P1, P2, and P3. The first terminal (P1) is for connecting the drain switch to a remote power supply. More particularly, the terminal (P1) is connected via the laminated bus bar (3) to the positive terminal of the large storage capacitor (5) and the 1 KW power supply. The laminated bus bar (3) is illustrated as consisting of a series inductance shunted by a resistance, the combination being connected in series with a second resistance. The quantities, as will be explained, become of practical significance when the power is transferred in pulses having rapid rise times and short durations. The second power terminal (P2) is the output terminal for connecting the regulating drain switch to the associated MMIC T/R module load (32). The lead inductance between the regulating drain switch and the MMIC module is illustrated at 12. The lead inductance becomes significant when energy is supplied in short pulses. Should the regulating drain switch be allowed to turn on or turn off with a rapid rise or fall time, the inductance causes ringing in the load. The third power terminal (P3) is the ground return to which both the supply and the load are returned.

The control signals applied to the regulating drain switch are introduced via the thirty-one pads (36) on the substrate (34) (FIG. 4). As seen in FIG. 6, the controls include the transmitter enable control which turns the regulating drain switch on and off as each pulse is transmitted, the calibrate control used to establish and increment the reference voltage and "other corrections" which may be used to correct for module to module variations or for other purposes.

The circuit of the digitally programmable regulating drain switch (37) is illustrated in FIG. 6. The principal components include a temperature compensated voltage reference (10), a digital to analog converter (DAC) and RAM (11), a two-stage gating buffer (T2, T3), an operational amplifier (OPAMP) (13), a discrete power MOS transistor (T1), capacitors C1 to C3 and resistors R1 to R6.

The nature of the foregoing components and their connections are as follows. The temperature compensated voltage reference (10) is connected via voltage dropping resistor (R6) to the 12 volt internal drain supply bus (14) and to the internal ground connection of the drain switch. The value of the resistor (R6) is selected to optimize regulator performance. The temperature compensated voltage reference may be a temperature compensated Zener reference or a band gap regulator, which tends to be inherently temperature stable. The quality of temperature compensation should be sufficiently high to maintain the output voltage within a millivolt of the nominal five to seven volt Zener value through the expected range of temperature variation. The temperature is affected by both ambient temperature and the dynamic temperature equilibrium within the equipment arrived at between the heating caused by dissipation in the electronics and the air cooling. Typically, the temperature compensation range should be through 100 degrees C.

The output of the voltage regulator 10 is coupled to the signal input of the DAC and RAM (11). The element (11), in the example, is one-quarter of an integrated circuit type AD 7225 having both a D to A conversion feature and memory storage. Typically the D to A converter has eight bits of resolution permitting one to increment or decrement the input signal fed to the RAM in 256 parts. The output signal of the member (11), replicates the voltage reference, plus or minus increments of this size as a function of the calibration and correction controls.

The output of the DAC and RAM (11) is coupled via a two-stage, temperature stable, gated buffer which provides a desirably low impedance drive, to the input of the OPAMP (13). The gated buffer consists of an NPN transistor (T2) type 1904 in an emitter follower configuration forming the first stage of the buffer followed by a PNP transistor (T3) type 1906, also connected in an emitter follower configuration, forming the second stage of the buffer.

The buffer connections between the DAC and RAM (11) and the OPAMP (13) are as follows. The signal from the DAC and RAM (11) is coupled to the base of the transistor (T2). The collector of transistor (T2) is connected to the B+ bus and the emitter of transistor (T2) is connected through the 2K ohm bias resistor (R5) to the internal ground. The signal appearing at the emitter of (T2) is coupled to the base of (T3). The collector of transistor (T3) is returned to ground and the emitter of transistor (T3) is connected via a biasing and buffering resistor (R1) to the control input for the transmitter enable signal. The emitter of the buffer is then connected to the positive input of the OPAMP (13).

The use of the two NPN/PNP emitter follower buffer stages between the DAC and RAM (11) and the OPAMP (13) produces a temperature stable buffer of low driving impedance for the OPAMP. The temperature compensation follows from the fact that complimentary transistors are employed in the signal coupling path so that any temperature induced drift in the input junction voltage of the first transistor is substantially equal to and of opposite sign to that of the second transistor. Thus the two deliver a compensated output voltage to the input of the OPAMP. The emitter follower configuration produces a downward impedance transformation, which having taken place twice, produces a low final driving impedance for the operational amplifier (13). The resistor (R1) in the transmitter enable path to the OPAMP has a high value of 3.3K relative to the low impedance of the buffer output. The resistor (R1) accordingly provides both biasing for the output stage of the buffer and buffering action tending to reduce any noise on the transmitter enable control path that might appear at the OPAMP input.

The OPAMP (13), which is gated on or off by the transmit-enable control, compares the output across the MMIC load with the reference supplied from the DAC and RAM (11). It then adjusts the gain of the transistor switch (T1) connected between the dc bus and the MMIC load in a tight feedback loop to bring the voltage at the load into proportional correspondance with the reference voltage.

The connections to the negative input terminal of the OPAMP are as follows. The negative input terminal of the OPAMP (13) is connected to the connection between resistors R2 and R3 which together form a voltage divider connected between the pad (P2), to which the MMIC load (32) is connected, and ground. This connection supplies a voltage to the negative input terminal of the OPAMP which is equal to half the voltage appearing across the load. A 470 picofarad capacitor, which provides high frequency feedback, is coupled between the output of the OPAMP and the negative sense input terminal.

The output terminal of the OPAMP (13) is connected to the gate of transistor switch (T1) which controls the flow of current from the dc bus to the MMIC load, and thereby controls the voltage at the MMIC load. The connection is an ac connection made via a 0.1 microfarad coupling capacitor (C1). A 10K ohm resistor (R4), which is connected between the gate and source of transistor (T1) acts to discharge the coupling capacitor (C1) after a short time. The drain of the transistor (T1) is connected to the internal B+bus (14) and to the positive terminal of a moderately sized filter capacitor (C3) located in proximity to the T/R sub-assembly, the negative terminal of which is connected to the internal ground. The capacitor (C3) is shared between two regulating drain switches so that the effective capacity is approximately one half the indicated value. The capacitor size is dependent on its internal series resistance so that with a smaller series resistance, a smaller value, e.g. 25 microfarads may be adequate. The drain of the transistor (T1) is also connected to the pad (P1) for connection via the laminated bus bar (3) to the remote 1 KW power supply (4) and the remote large filter capacitor (5). The source of the transistor (T1) is connected to the pad (P2) to complete the current path from the dc bus (14) to the MMIC load (32).

The transistor (T1) is an N-channel 50 volt power MOSFET which has just recently become available. The characteristic in which the transistor has been particularly improved is in relation to the resistance drain to source (RDS) (on), which for currents on the order of 5 amperes is less than 0.1 ohms. In the present application, the voltage drop allocable to the regulator is approximately 0.2 of a volt at 5 amps, which reduces the dissipation in the regulator circuit if less "head room" is employed in the power supply. At the same time, the input capacitance of the device has been held to very low values, being typically less than 1000 picofarads. The result is that the bandwidth of the device, viewed as an amplifier, can be several megaHertz. The device is therefore fast enough to compensate for power supply variations occurring at the high rates required to turn on or turn off the pulse or for time to time variations within the pulse of the pulsed power amplifiers of a radar system.

The transistor, nominally a "linear device" when gated "on", may be gated on to a desired level of conductivity by a suitable setting of the bias and input signal levels. Due to the presence of gain in the feedback loop, linearity is not required for the loop to stabilize and the device may be operated any where in its active region. Thus, like other amplifiers, it may be used to provide a smoothly variable (if not linear) conductivity as required to provide a regulating switching action.

The choice of an N-MOS power transistor as the regulating drain switch as opposed to a P-MOS device provides several advantages, including lower cost. A disadvantage is that a voltage higher than the nominal B+ voltage is required to turn on the gate. Such a voltage however is easily obtained by using capacitor coupling from the OPAMP operating from +12 to 12 volts.

The regulating drain switch, whose circuit has just been described, provides a tight feedback loop connecting the OPAMP and the power MOS transistor which holds the output voltage of the power MOS transistor proportional to the reference voltage coupled to the positive terminal of the OPAMP. This relationship holds true so long as the loop gain is significantly above unity and the system's dynamic range is not exceeded. The 470 picofarad feedback capacitor limits the rise and fall time of the circuit to approximately 0.4 microseconds setting the upper limit in the response to the steep rise times appearing in high frequency transients. The purpose of this limit is to limit the voltage developed across the lead inductance (12) coupled to the individual T/R modules (32) to prevent ringing. The rise and fall time may accordingly be adjusted to the optimum value required to avoid ringing by selecting the correct size for the capacitor (C2) in the feedback loop.

Under normal operation which exists up until approximately one millisecond, the output voltage of the drain switch is directly proportional to the reference voltage. This assumes that the coupling capacitor (C1) has not yet discharged too much and that the loop gain continues to be significantly above unity. When the pulse width exceeds one millisecond, the voltage developed across the 0.1 microfarad coupling capacitor exceeds the reserve voltage dynamic range of the OPAMP causing the feedback loop to collapse. This in turn causes the output of the regulating drain switch to rapidly decay to zero.

Thus, the maximum on time of the drain switch is limited by the coupling capacitor (C1) and the gate source resistor (R4). AC coupling protects the MMIC load from being overheated and destroyed in the event of a hardware or software failure which would tend to keep the drain switch on for a longer period. This feature is particularly important where a small number of modules are incorrectly turned on and the peak demands thus created do not exceed the average current handling capability of the power supplies but may still cause overheating of individual module loads.

The operation of the power distribution system from the large one kilowatt supplies (4) to the individual T/R module (32) loads may best be explained by reference to FIGS. 7A and 7B. As earlier noted, the principal elements in this portion of the power distribution system include the one kilowatt power supply (4), the large filter capacitor (5), the laminated bus bar (3), the capacitors (C3) in the T/R sub-assembly, and finally the regulated drain switch (37) connected in series with the T/R module load (32).

These elements operate through several mechanisms to sustain the voltage at the T/R sub-assemblies during the 1 millisecond period envisioned as setting the outer limits of a transmitted pulse. During the first few microseconds, probably not over 10, the supply voltage is maintained by the local capacitor (C3) in the T/R sub-assembly, with an initial drop determined by the size of the series resistance of the capacitor. In the period from zero to 100 microseconds, the energy being supplied through the bus bar (3) from the large filter capacitors (5) is significantly modified by the series ac impedance of the bus bar consisting of inductance and resistance which vary during the conduction of high frequency energy. In the period between 100 microseconds to 1 millisecond the ac impedance of the bus bar is reduced to the dc value and the series resistance of the large capacitor now becomes significant. Granted that a voltage of $10.5 \pm \frac{1}{2}$ volt at the MMIC module load is desired, the present regulating drain switch will sustain the output voltage within the regulating accuracy of the drain switch over a transmitted pulse for a period in excess of 200 microseconds and approaching 1 millisecond.

Figure 7A:
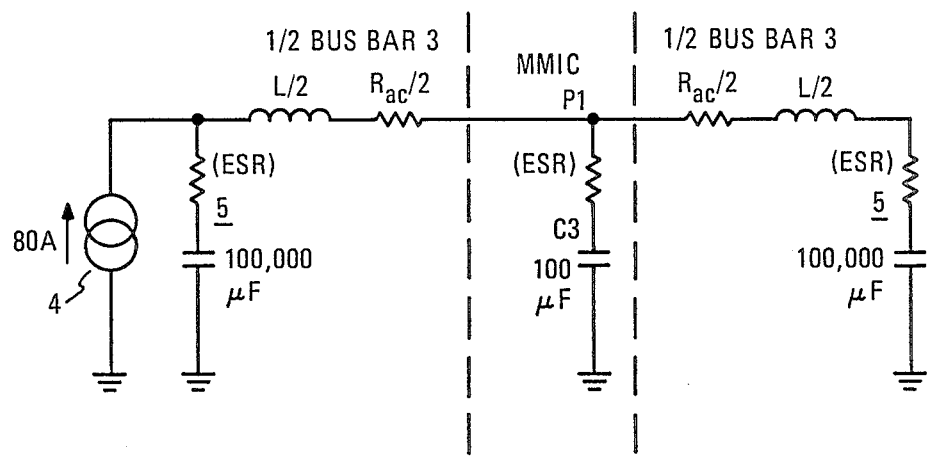
FIG. 7A is an illustration of an equivalent circuit and 7B of the electrical performance of the power distribution network.
Figure 7B:
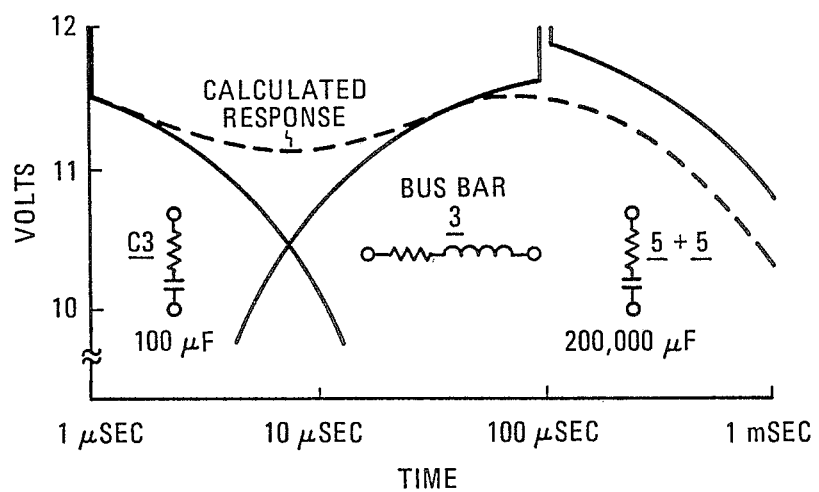

The voltage versus time performance of the power distribution network at the "worst case" T/R sub-assembly which is the T/R sub-assembly at the center of the row, and taken to the input of the regulating drain switch has been simulated on a computer leading to the predicted voltage versus time performance indicated by the dashed line in FIG. 7B.

The simulated performance assumes the simplified equivalent circuit representation illustrated in FIG. 7A. In the equivalent circuit diagram, the one kilowatt power supply (4) coupled to one end of the bus bar (3) is represented by the 80 ampere generator at the left extremity of the figure. The two large capacitors (5), one at each end of the bus bar, are represented by the equivalent series resistance (ESR) and the 100,000 microfared ideal capacitance. The symbols for the capacitors are appropriately placed at the left and right ends of the serially connected elements L/2 and Rac/2 in an ungrounded path, which together represent the bus bar. The two capacitors (5) are connected in shunt between the ungrounded conductor and the grounded conductor of the bus bar. The bus bar is appropriately illustrated in halves, since the load, which is not illustrated, and which corresponds to the worst case T/R subassembly, is placed at the middle of the bus bar and receives energy from both ends. The T/R module load appears at the center of the bus bar at node 40 between the dotted lines denominated MMIC and containing an r/c equivalent circuit representation of the capacitor (C3). The load consists of the serially connected MMIC module and the regulating drain switch, which are connected between the ungrounded and grounded bus bars. For simplified consideration, the lead inductances to the MMIC module and within the capacitors have been neglected.

The calculation which assumes known values for each of the foregoing parameters using available components is illustrated as a dashed line in FIG. 7B, which represents the input to the regulating drain switch as noted earlier. The time coordinates of the graph are logarithmic while the voltage coordinates are linear. From a visual inspection one may observe that the dashed line remains above 11 volts from the left origin until approximately 0.5 milliseconds. From this, one may conclude that a regulator requiring only 0.2 of a volt of headroom could supply a stable voltage at the load of 10.5 volts for periods as long as 0.5 milliseconds. The dotted line which starts near the 1 microsecond time origin, at 11.5 volts dips slightly less than ½ volts at under 10 microseconds, climbs gradually, peaking below 100 microseconds at about 11½ volts, and then falls gradually to about 10.3 volts at 1 millisecond.

The rationale for the dashed computer plot may be provided with reference to the three solid lines preceeding from the left to the right in the illustration.

The energy which is coupled to the MMIC T/R module during pulsed operation is supplied from three sources illustrated in FIG. 7A; by the discharge of the capacitor C3 in the T/R subassembly; by discharge of the large (100,000 microfared) capacitor 5, and the 1 KW power supply (4). Under normal length pulses, the principal energy is supplied by the discharge of the two capacitors with the bus bar inductance and the parasitic resistances absorbing energy that would otherwise be available to the load. The discharge of the bus bar inductance normally occurs after the pulse. The 1 KW power supply (4) supplies a small fraction of the energy during the transmit pulse.

Operating with the foregoing verified, but variable assumptions, the three solid lines of FIG. 7B illustrate the principal mechanisms affecting the amplitude of the output voltage at the input to the regulating drain switch. At the beginning of a pulse, within about one microsecond, the voltage falls steeply ½ volt from the no load value of 12 volts of the 1 KW supplies. This voltage would then fall gradually to below 10 volts at 10 microseconds were it not supported by energy from the laminated bus bar. The first solid line represents the discharge of the T/R subassembly capacity C3, through its own series resistance into the RF module load. The time constant of the discharge assumes a low impedance load connected at the node 40, and is set by both the value of the capacitance and the series resistance. If the series resistance can be materially reduced, the value of the capacitance may be reduced proportionately. Available Tantalum and ceramic capacitors, are suitable, while aluminum electrolytic capacitors suffer from excessive series resistance.

The second solid line which extends from several microseconds to about 100 microseconds represents the effect of a decreasing complex impedance presented by the bus bar as energy is now supplied to the load at the center of the bus bar from the two large storage capacitors (5) at the ends of the bus bar. The process starts as the steep initial current transient flows into the two ends of the bus bar. The initial ac impedance of the bus bar is high, but as the transient progresses, the ac impedance falls, and at about 100 microseconds the time constant represented by the bus bar and its series resistance is discharged and only the relatively low dc resistance remains, leading to the third solid line, applicable to the final portion of the pulse.

The third solid line, which extends from about 100 microseconds to one milisecond, represents the effect of the series resistance of the large storage capacitor as it supplies energy to the bus bar. The voltage drop of the capacitor (5) due to its series resistance is about 0.1 volts and significantly less than that due to the final dc resistance of the bus bar. The following line from 100 microseconds on represents the discharge of the capacitor through its own series resistance to a low impedance load. The energy as earlier noted, is usable through a large part of the remaining one millisecond by a load requiring 10.5 volts at the regulator output.

The undulating dashed line thus represents a combination of the three effects just discussed and portrayed by the three solid lines. Recapitulating, the first few microseconds represent almost exclusively the supply of energy from the capacitor(s) C3 in the T/R subassembly. After a few microseconds, however, energy begins to appear at the node 40 of the T/R subassembly delivered via the bus bar from the two large storage capacitors (5). The two energy sources act together through 10 microsecond to sustain the output voltage at the node 40, with less than a half volt dip. As one approaches 100 microseconds, the supply of energy is affected by the dc resistance of the bus bar (which is no longer changing) and the series resistance of the capacitor. These parasitic resistances are small, modifying the gradual load determined discharge of the large capacitor into the T/R modules on the same bus bar through a period approaching one millisecond.

The graph of FIG. 7B is premised upon the values of the indicated variables. The ESR of the large capacitor (5) is about 2.2 milliohms with a maximum RMS current of 30 amperes. The capacitor C3 if of Tantalum has 50 milliohms assuming a 100 microfarad capacity. Equivalent performance may be obtained if a ceramic capacitor is substituted of 2.2 microfarads with an ESR of 20 milliohms. The parameters of the bus bar are dependent upon the conductor geometry, the most important factors of which are to maintain minimum length (L) and maximum width (W) in the interest of minimum RF impedances. Each +12 volt conductor of the bus bar carries a peak current of 320 Amperes with an average of 80 Amperes or 960 Watts with a 25% duty cycle to operate the 16 T/R subassemblies associated with that conductor. With four +12 volts conductors in the bus bar the totals are four times greater. The +5 volt conductor delivers 16 amperes continuously and the −12 volt conductor carries about one ampere.

The foregoing load requirement (e.g. 80 ampere average load) using convention copper ratings leads to individual conductors with a cross section corresponding to number 6 wire. However the requirement that the conductors deliver significant amounts of power 3 or 4 feet away from the source within several microseconds imposes severe requirements on the conductor configuration as noted earlier. The affected parameters control the serial high frequency inductance and the serial high frequency resistance of the bus bar conductors.

For mechanical convenience the minimum thickness of the individual conductors is 0.020 inches as earlier stated. Given greater current loads that value may be increased, but not decreased. The width of the conductors is then scaled to the current magnitude. Greater width is a very significant factor in reducing both the series RF inductance (L) and the series RF resistance (Rac) of the bus bar conductors. In the application, a width of approximately 2 inches is appropriate.

The electrical properties of the bus bar applicable to the transfer of high frequency electrical energy are the shunt capacity C, the shunt leakage (G), the skin depth (SD), the series RF inductance (L), the series RF resistance (Rac). (The characteristic impedance Z of the line viewed as a transmission line is not used in the design).

In the design, the shunt capacitance has proven to be small and may be neglected.

$$C = \frac{0.223 \times K \times W \times L}{D} \text{ picafarads} \quad (1)$$

where
K = realtive dielectric constant of the dielectric layer
W = conductor width in inches
L = length of the bus bar
D = the thickness of the dielectric layer The conventional dielectric thickness is 0.0055 inches. Since the bus bar is a low voltage bus bar, one could reduce the dielectric thickness. Practical considerations however suggest a thickness of about 0.003 inches as a minimum for the dielectric layer.

The shunt leakage (G) for conventional dielectric material is also small and may be neglected.

$$G = \frac{U \times W}{D} \text{ mhos/inch} \quad (2)$$

The skin depth (SD) enters into the critical expressions (3)(4) affecting high frequency energy transfer:

$$SD = \frac{1}{\text{pi} \times f \times M \times N} \text{ inches} \quad (3)$$

where
f = the frequency of the applied wave
M = the permeability of copper (substantially unity), and N = the conductivity of copper The skin depth for 100 kHz is 0.0082 inches.

The series inductance (L) limits the high frequency transfer:

$$L = \frac{31.9 (d + SD) + 1}{W} \text{ nanoHenries} \quad (4)$$

It suggests greater width for the bus bar (e.g. approx. 2), and dictates that both sides of the bus bar be used with an opposing ground plane of equal dimensions, with a reduction in inductance of almost two. It also suggests minimum length achieved by supplying energy from both ends of the bar to reduce L by one half, i.e., by use of two capacitors (5). The skin depth of 0.0082 inches assuming 100 kHz signal content dominates equation (3), once the dielectric thickness falls substantially below equality. However, the variables determining skin depth are not subject to easy manipulation, copper being a preferred conductor, and the technology for its use highly evolved.

The RF resistance (Rac) is the second critical limit on the bus bars high frequency energy transfer capability.

$$Rac = \frac{4 \times 1}{SD \times W \times N} \text{ ohms} \quad (5)$$

Here again, the configuration favors reducing the length (in half) by supplying energy to the bus bar for both ends (i.e., by the use of 2 capacitors (5)). The expression also suggests that increasd width will reduce the high frequency resistance.

The expression for characteristic impedance (Z) of the transmission line follows:

$$Z = \frac{R + jWL}{G + jwC} \text{ ohms}$$

The expression lacks utility in the present circumstances in which high losses due to skin effect, create a very low "Q" at 100,000 Hz. This "Q" is less than one. In addition a low load impedance prohibits an impedance match to the characteristic impedance of the line. The analysis and supporting experiments have shown that the delivery of significant high frequency energy in a pulse system along a bus bar depends on minimizing the series RF inductance L and the series RF resistance Rac and/or their resultant.

Summarizing, the skin depth equations are dependent upon the material and favor copper over other available materials as for instance brass. The geometry factors recommend minimum length for the bus bar in its conductance of high frequency energy to the individual loads. This suggests that the large capacitors (5) not be placed at one end of the bus bar alone but at both ends to shorten the effective length of the bus bar as viewed from individual loads. Finally, the width factor appears in the denominator of both the expression for RF inductance and RF resistance. A design which uses a elongated rectangular cross section is favored. The present application calls for the dimension being 2 inches wide by 0.020 inches in thickness.

The design considerations and calculated performance assume the center MMIC module to be the load and an exemplary worst case. The voltage variation at the other sites would be significantly less in the 3 microsecond to 100 microsecond time frames. During this first interval, the ac properties of the bus bar control the distribution of energy to the individual T/R subassemblies. In the 100 microsecond to millisecond time frame, the performance is substantially identical. If the bus bar output were directly applied to a load (with local capacity C3 but not the regulation drain switch 32 in place) the drain voltage would vary slightly from module to module in the approximately 10 microsecond time frame. The variation would not vary from pulse to pulse in a normal radar pulse train. When used with the regulating drain switch, the power distribution system will provide a substantial uniform power to all the MMIC modules in the various T/R subassemblies.

Figure 3A:
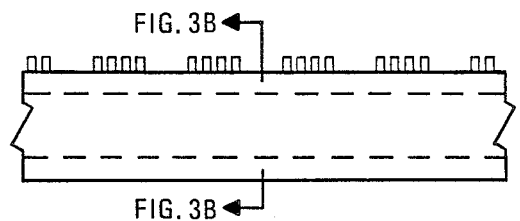
Figure 3B:
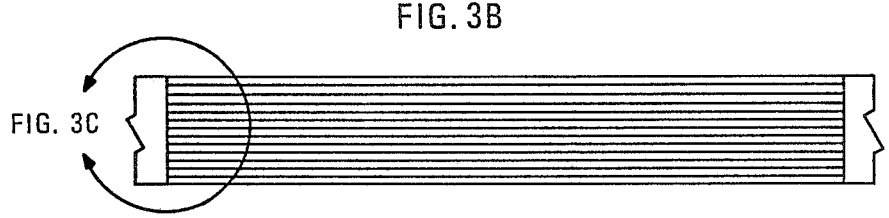
Figure 3C:
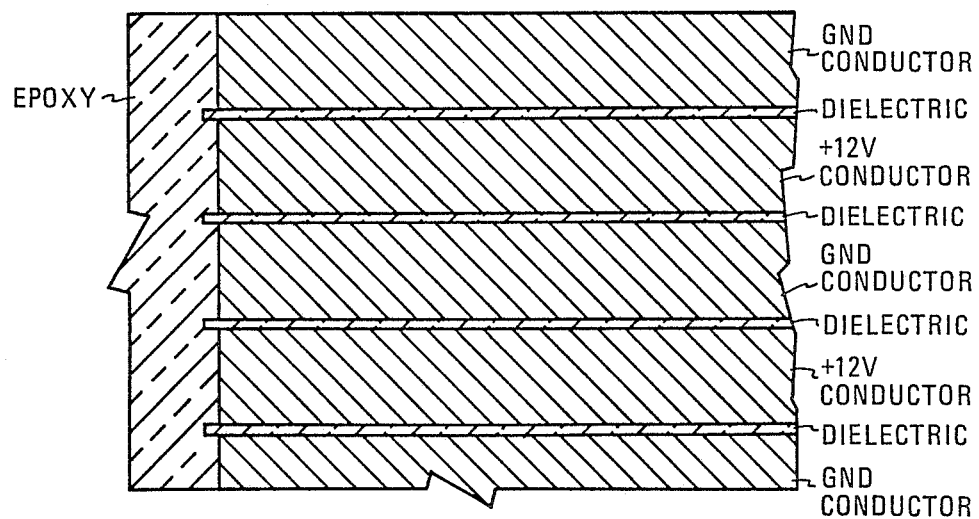

FIG. 3D is a simplified illustration of the packaging of the bus bar to include both the power connectors (already illustrated and discussed in connection with FIGS. 3A, 3B and 3C), and the control connections to the T/R subassemblies (2). Each subassembly is provided with a connector, typically 31 pins with 1 Ampere average capacity. The laminated bus bar is factory assembled to provide four taps at each of the 64 subassembly positions. Thirty-one pin sockets(41) are then provided assembled upon the bus bar, which are connected to the four power taps(42) leading to the four appropriate bus bar conductors. The socket pins are paralleled as necessary to meet the carrying capacity and the parallel pins are connected to the four power taps. These connections are all made as part of a factory assembly process in which the output connectors are verified pin by pin with comparable input connectors at the ends of the bus bar to verify the integrity of the wiring.

The control connections are provided by a factory assembled flex strip plug(43) which branches from a flex strip bus, bonded to the undersurface of the bus bar (3). The connectors (43) are placed at each of the 64 subsassembly positions along the bus bar. These connections are also made the part of a factory assembly process in which the output connectors are verified pin by pin with comparable input connectors at the ends of the bus bar to verify the integrity of the wiring.

Integration of the power and control functions into a single unitary factory assembled structure permits the connections to be indexed with precision along the bus bar at the T/R subassembly positions and compliantly mounted on the bus bar. Thus a single plug providing the necessary current handling capacity provides all the dc power and all the logic commands required to operate the MMIC modules. The arrangement is simply and unambiguously tested, and without danger of damaging expensive electronics equipment by a test fixture which connects to the bus bar input connectors and to the module output connectors and which is programmed to conduct a point by point check of all the connections. In the present embodiment, there are 30,000 connections making mechanized verification essential.

The entire laminated bus bar system with logic commands, involving redundancy and randomness in the high power connections is thus susceptible of complete and automatic testing with a tester designed for the purpose.

The use of a regulating drain switch to sustain the voltage across a pulsed load for the duration of the pulse permits the saving of both space and bulk in the power supply at the T/R sub-assembly. The regulating drain switch herein proposed is easily fabricated in hybrid form creating neither a space problem—since the added electronics are small, nor adding heat dissipation—since the regulating function adds no additional heat over that of a switch and its circuit. A net saving in bulk is achieved since the regulating drain switch, as an active means of regulation, allows the same degree of voltage stabilization to be achieved with a smaller filter capacitor at the T/R sub-assembly. In a practical example, a three to one reduction in local capacity and thereby a significant saving in power supply volume and bulk is achieved. As noted earlier, the novel power distribution system relying on a small capacitor at the individual T/R subassembly loads, a bus bar of low RF resistance and low RF inductance for conveying energy from a large storage capacitor to the loads may be used with a regulating drain switch to achieve high level accuracy. Where power supply voltage requirements do not require this accuracy the novel power distribution system without the regulating drain switch produces a large improvement under pulse conditions in the stability of the supply voltage.

The illustration in FIG. 1 indicates an array in which the laminated bus bars are in a horizontal plane, and the large storage capacitors and 1 Kw power supplies are disposed along the vertical sides of the array. One may with equal and often greater convenience arrange the bus bars vertically with all 1 Kw power supplies in a horizontal line at the bottom of the array. This shortens the major current supply paths to the 1 Kw supplies which must pass through the rotating bearing at the bottom of the array, and lowers the weight carried by the bearing. Accordingly, the terms "rows and columns" are intended to apply equally to the case where the "rows" are horizontal and the "columns" are vertical as to the case where the "rows" are vertical and the "columns" are horizontal.

The power distribution system for the MMIC power modules requires particular attention to minimizing the lead inductances in the high current paths by which power is supplied to the individual transmitting modules. These constraints—with several others, including the need for common cooling, easy repairability and easy assembly and disassembly—dictates a modular approach and the inclusion of the transmitting modules into a single package with the power conditioning. With a single package, a unitary connector may be used to supply power and control commands from a common bus. In forming the T/R subassembly, (which is the modular element) combining four T/R modules has proven to be the most satisfactory. Given a four T/R module package, one may consolidate some capacitors—from four to two or to one to provide the requisite local energy storage. In the disclosed embodiment, the regulators are not shared, but may be shared, between the transmitting modules in a single T/R subassembly. Packaging the transmitting modules with the local power conditioning including local capacitance and local regulation is beneficial in achieving a compact and efficient design.

In the laminated bus bars, which provide a low impedance means to deliver large amounts of high frequency power over distances of several feet within a few microseconds, several factors are important. The bus bar conductor is preferrably copper, adequately thick (0.020 or greater) to have the necessary skin depth for efficient r.f. power transmission. Aluminum and brass lack the requisite properties. Gold and silver would appear to be satisfactory, but are too expensive. In view of the deep skin depth, customary thin platings are also unsatisfactory.

The equations defining the high frequency inductance and the high frequency resistance of the bus bars dictate minimizing the length and increasing the width of the bus bar for each path from the large capacitors—which supply the high frequency energy in the dc pulses—to the individual T/R subassembly connectors which consume the high frequency. Thus the r.f. impedance (inductance and resistance) is greatly reduced when the central rectangular conductor has an elongated cross section and is provided with a grounded conductor of comparable current capacity on either side. The arrangement efficiently doubles the width of an already wide (2") r.f. path without making the bus bar unduly unwiedly. Putting the large capacitors at both ends of the bus bar reduces the path length and reduces the r.f. impedance.

The reliability of the power supplies is also increased by the use of a few large capacitors shared between the many modules connected to a common bus bar. The chance of capacitor failure is largely independent of size, given equally conservative ratings, so that the failure rate falls in proportion to the reduction in total numbers of capaciors.

What is claimed:

1. A power distribution system for an array of transmitting sub-assemblies containing transmitting power amplifiers arranged in rows and columns behind the antenna elements in a phased array radar system, the power amplifiers in said sub-assemblies simultaneously demanding high current low voltage dc power in pulses whose duration may vary, said system comprising
   (A) a plurality of subassembly connectors, each for supplying low voltage dc power to an associated subassembly, said connectors being disposed in rows and columns at said subassembly positions,
   (B) a first plurality of energy storage capacitors, each disposed at a subassembly position and connected to the proximate subassembly power connector, each capacitor having adequate capacity and an adequately low series resistance for providing the peak power required by the associated subassembly during a first short period embracing the beginning of each pulse while maintaining the voltage at said subassembly power connector within a predetermined difference from the no load value acceptable for operation of said power amplifiers, and
   (C) a plurality of high current, low voltage, high power dc supplies, the supplies being disposed at the ends of said rows of subassemblies with adequate average power capacity for operating the associated transmitting sub-assemblies in the associated row,
   (D) a second plurality of large, energy storage capacitors, one capacitor being disposed at at least one end of each row of subassemblies, and having adequate energy storage capacity and an adequately low series resistance for providing the peak power required by the subassemblies in the associated row for a second longer period commencing before the end of said first period and embracing the final portions of said pulses, and
   (E) a plurality of laminated bus bars, one for each row of sub-assemblies, in which each power transmission path consists of an ungrounded conductor of rectangular cross section disposed between a pair of grounded conductors and separated by dielectric to double the effective width of the path for efficient high frequency transmission, said large storage capacitors and said high power supplies being connected at the ends of said conductors and said subassembly power connectors being connected at said subassembly positions along said conductors, said laminated bus bar being dimensioned with adequate width to exhibit an adequately low high frequency series inductance and an adequately low high frequency series resistance and said large energy storage capacitors having an adequately low series resistance to maintain the voltage at the subassembly connectors within said predetermined difference from the no load value from the end of the first period through said second period.

2. The power distribution system set forth in claim 1 wherein at least one of said plurality of large energy storage capacitors, is disposed at each end of each row of subassemblies to minimize the path length from said large capacitors to said assemblies.

3. The power distribution system set forth in claim 2 having in addition thereto,
   a plurality of regulating means, at least one disposed at each subassembly position for sustaining the voltage at the power amplifier(s) in each subassembly at a fixed value so long as the voltage at said subassembly power connector is within said predetermined difference from the no-load value.

4. The power distribution system set forth in claim 1, wherein
   the capacitors of said first plurality have adequate capacity and an adequately low series resistance for providing the peak power required for at least the first few microseconds, and
   the large capacitors of said second plurality have adequate capacity and an adequately low series resistance, when said bus bars have an adequately low r.f. impedance for providing the peak power required after said first few microseconds to the end of said pulses.

5. The power distribution system set forth in claim 4 wherein
   the r.f. parameters of said bus bar are selected to facilitate the supply of energy from several microseconds until approximately one hundred microseconds, the power transmission through the bus bar thereafter being limited primarily by the dc resistance of the bus bar and the series resistance of said large capacitors.

6. The power distribution system set forth in claim 5 wherein each capacitor of said first plurality of capacitors, and each regulating means is installed in a common subassembly with the power amplifier(s) deriving energy therefrom.

7. The power distribution system set forth in claim 6 wherein
   the subassemblies in each row are subdivided into P groups for energization of said power amplifiers, where P is a small integer,
   P power transmission paths are provided in each bus bar for said power amplifiers, each path being connected to 1/P of the subassemblies and
   2P large energy storage capacitors of said second plurality and
   P high power supplies are provided.

8. The power distribution system set forth in claim 7 wherein said groups of subassemblies are selected to minimize the adverse affect on the transmitting pattern from failure of one supply.

9. The power distribution system set forth in claim 8 wherein said transmitting subassemblies in each row also contain receiving low noise amplifiers separately energized from said power amplifiers, each laminated bus bar has a power transmission path for energization of said low noise amplifiers, all of said P high power supplies associated with a row being connected to supply power to the low noise amplifiers in said row to prevent failure until all (P) supplies have failed.

10. A power distribution system for an array of transmitting subassemblies containing transmitting power amplifiers arranged in rows and columns behind the antenna elements in a phased array radar system, the power amplifiers in said subassemblies simultaneously demanding high current low voltage dc power in pulses whose duration may vary, said system comprising (A) a plurality of subassembly connectors, each for supplying low voltage dc power to an associated subassembly, said connectors being disposed in rows and columns at said subassembly positions, (B) a first plurality of energy storage capacitors, each disposed at a subassembly position and connected to the proximate subassembly power connector, each capacitor having adequate capacity and an adequately low series resistance for providing the peak power required by the associated subassembly during a first short period embracing the beginning of each pulse while maintaining the voltage at said subassembly power connector within a predetermined difference from the no load value, and (C) a plurality of regulating means, each disposed at a subassembly position for sustaining the voltage at the power amplifier(s) in each subassembly at a fixed value so long as the voltage at said subassembly power connector is within said predetermined difference from the no-load value, (D) a plurality of high current, low voltage, high power dc supplies, each supply being disposed at one end of said row of subassemblies with adequate average power capacity for operating the transmitting subassemblies in the associated row, (E) a second plurality of large, energy storage capacitors, one capacitor being disposed at each end of each row of subassemblies, to minimize the path lengths to the subassemblies and having adequate energy storage capacity and an adequately low series resistance for providing the peak power required by the subassemblies in the associated row for a second longer period commencing before the end of said first period and embracing the final portions of said pulses, and (F) a plurality of laminated bus bars, one for each row of subassemblies, in which each ungrounded conductor of rectangular cross section is disposed between a pair of grounded conductors and separated by dielectric to double the effective width of the path for efficient high frequency transmission, said large storage capacitors and said high power supplies being connected at the ends and said subassembly power connectors being connected at said subassembly positions along said conductors, said laminated bus bar being dimensioned with adequate width to exhibit an adequately low high frequency series inductance and an adequately low high frequency series resistance and said large energy storage capacitors, exhibiting an adequately low series resistance to maintain the voltage at the subassembly connectors within said predetermined difference from the no load value from the end of the first period through said second period.

11. A power and control command distribution system for an array of transmitting subassemblies containing transmitting power amplifiers, receiving low noise amplifiers and phase shifting elements, each subassembly being arranged in rows and columns behind the antenna elements in a phased array radar system, and requiring dc power in pulses and control commands, said system comprising (A) a plurality of subassembly connectors, each supplying low voltage dc power and control commands to an associated subassembly, said connectors being disposed in rows and columns at said subassembly positions, (B) a first plurality of energy storage capacitors, each disposed in a subassembly and connected to the proximate subassembly power connector, each capacitor having adequate capacity and an adequately low series resistance for providing the peak power required by the associated subassembly during a first short period embracing the beginning of each pulse while maintaining the voltage at said subassembly power connector within a predetermined difference from the no load value acceptable for operation of said power amplifiers, and (C) a plurality of high current, low voltage, high power dc supplies, each supply being disposed at one end of said row of subassemblies with adequate average power capacity for operating the transmitting subassemblies in the associated row, (D) a second plurality of large, energy storage capacitors, one capacitor being disposed at each end of each row of subassemblies, and having adequate energy storage capacity and an adequately low series resistance for providing the peak power required by the subassemblies in the associated row for a second longer period commencing before the end of said first period and embracing the final portions of said pulses, and (E) a plurality of control command input connectors, one for each row of subassemblies, (F) a plurality of laminated bus bars providing paths for supplying power and control commands to each row of subassemblies, in which each power transmission path consists of an ungrounded conductor disposed between a pair of grounded conductors with interspersed dielectric layers, the members dimensioned to provide a low r.f. impedance for pulsed dc power, and paths for control commands comprising a plurality of thin conductors in a common plane, bonded to a grounded conductor of a power transmission path, said large storage capacitors, said high power supplies, and said control command input connectors being connected at the ends of said laminated bus bar and said subassembly power and control connectors being connected along said bus bar at said subassembly positions.

* * * * *